United States Patent [19]

Beaulieu

[11] 4,000,496
[45] Dec. 28, 1976

[54] FILMING CAMERA WITH A SYNCHRONOUS SOUND RECORDING

[75] Inventor: Marcel Beaulieu, Langon, France

[73] Assignee: Beaulieu S.A., Romorantin-Lanthenay, France

[22] Filed: Jan. 9, 1975

[21] Appl. No.: 539,835

[30] Foreign Application Priority Data

Jan. 11, 1974 France .......................... 74.01016

[52] U.S. Cl. .................................. 352/14; 352/180
[51] Int. Cl.² .................. G03B 31/00; G03B 21/48
[58] Field of Search .......................... 352/14, 180

[56] References Cited
UNITED STATES PATENTS 3,825,327   7/1974   Kosarko et al. ................... 352/14

Primary Examiner—Russell E. Adams, Jr.
Attorney, Agent, or Firm—Schuyler, Birch, Swindler, McKie & Beckett

[57] ABSTRACT

A filming camera having a synchronous sound recording of the type in which the film is driven by a claw undergoing a reciprocating movement produced by a motor and, downstream of the claw, by a capstan driven by a second motor, wherein the claw motor has a constant speed and the capstan motor speed is variable and means are provided to make the average speed of said capstan motor a determined function of the claw motor speed.

9 Claims, 1 Drawing Figure

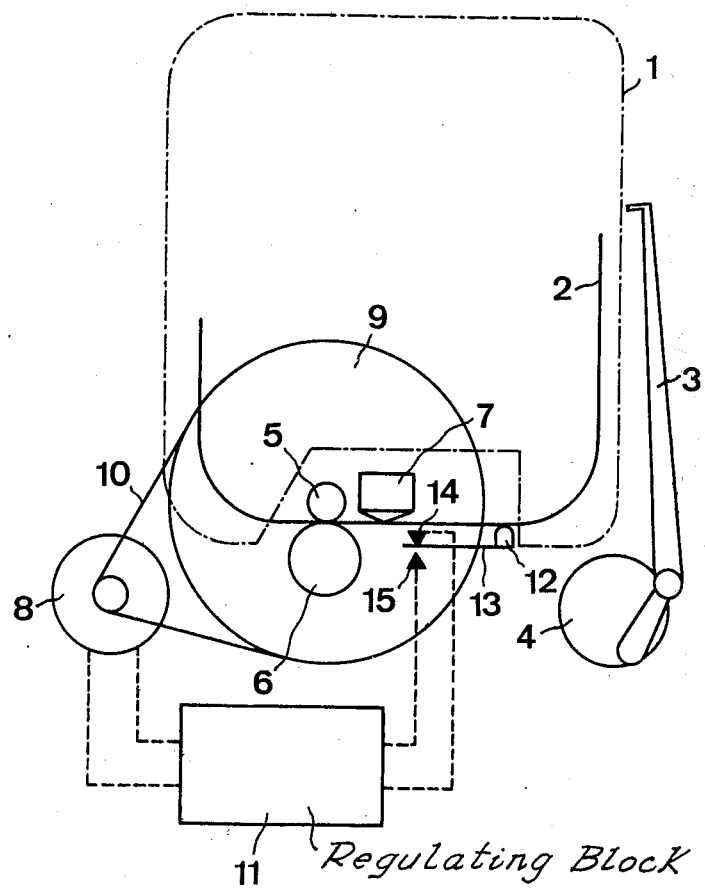

FILMING CAMERA WITH A SYNCHRONOUS SOUND RECORDING

The present invention relates to a filming camera with a synchronous sound recording.

In a certain number of cinematographic cameras having a sound recording, the film is driven by a claw which undergoes a reciprocating movement produced by a motor and, downstream of the claw, by a capstan driven by a second motor. The sound recording head is located between the claw and the capstan.

The first motor drives the film past the filming aperture with a jerky movement whereas the second motor winds up the film at constant speed. In order to absorb the jerky movements of the film due to the claw, a loop of film is formed between the claw and capstan. The mean speed of forward travel of the film under the action of the claw must be exactly equal to the mean peripheral speed of the capstan and consequently the speed of one of the motors must depend on the speed of the other.

It has already been proposed to make the speed of the claw motor depend on that of the capstan motor, the latter speed being constant. For this purpose, the claw motor has two speeds, one corresponding to a linear film drive speed distinctly higher than that of the capstan, the other being lower. The switching from one speed to the other is controlled by a loop sensor which causes the switching to the low speed as soon as the loop has lengthened a predetermined amount. At this moment, the loop shortens and this causes the release of the sensor and the switching of the motor to the high speed. These successive switchings are repeated throughout the forward film driving periods of the claw so as to avoid an excessive lengthening of the loop.

Although this arrangement results in an excellent sound recording, it produces flicker in the image due to a variable exposure of each of the images.

An object of the present invention is to avoid any image flicker in these types of camera.

For this purpose in the camera according to the invention the claw motor has a constant speed and the capstan motor speed is variable and means are provided to make its average speed a determined function of the claw motor speed.

Other objects of the present invention will be set forth specifically hereinafter or will be obvious from the following description. Such description makes reference to the annexed drawings wherein the sole FIGURE is a schematic view of one embodiment of the camera according to the invention.

Referring now to the drawing, the camera comprises a cartridge 1 in which the film 2 is driven by a claw 3 which undergoes a reciprocating movement produced by the motor 4 and, downstream of the claw 3, by a capstan 5 cooperating with a bearing roller 6, the sound recording head 7 being located between the claw 3 and the capstan 5. The motor 8 drives the capstan 5 through the flywheel 9 and the flexible belt 10.

The motor 8 is driven through a regulating block 11 controlled by a film loop sensor 12 biased in contact with the film loop 2 and having a stem 13 in contact with one or the other of two studs 14,15 according to the length of the film loop. The control circuit of the motor 8 is such that when the stem 13 is in contact with the stud 14, the speed of said motor is lower than its mean speed and when the stem 13 is in contact with the stud 15 the speed of motor 8 is higher than its mean speed.

Such an arrangement provides for giving to the capstan 5 a mean peripheral speed exactly equal to the mean speed of forward travel of the film 2 under the action of the claw 3.

As the forward travel and stoppage of the film in the filming zone are perfectly indentical for each revolution of the capstan, any cause of image flicker disappears.

In this case, in order to damp the very rapid variations in the speed of the capstan motor to render the speed of the film on the capstan and consequently on the recording head as even as possible, the capstan is arranged, in accordance with the invention, in the form of a flywheel and is driven by its motor through a very flexible belt. A good sound recording quality is thus ensured.

The flywheel may also be constructed in two parts, one of which is driven by the capstan motor through a belt, the second part being rotatable with respect to the first part and elastically biased to a position of equilibrium with respect to the first part.

This arrangement, which may be optionally combined with the preceding arrangement, also ensures a good sound recording quality.

What I claim is:

1. A sound motion picture camera for synchronous recording of images and sound on film comprising
   a reciprocating claw for driving said film,
   a constant speed claw motor for driving said claw,
   a capstan located downstream along the path of the film from said claw,
   a variable speed capstan motor for driving said capstan, and
   means for controlling the average speed of the capstan motor as a function of the movement of said film by the driving action of said reciprocating claw.

2. A camera as claimed in claim 1 wherein the capstan motor has two speeds,
   and including a loop sensor biased in contact with said film for sensing the length of a loop formed by said film as driven by said claw, the speed of said capstan motor being controlled by said sensor as a function of the length of said loop, whereby the speed of the capstan motor is a function of claw motor speed.

3. A camera as claimed in claim 2 wherein of said two speeds of said capstan motor, one of said speeds is higher than a mean speed of said motor, the other of said speeds is lower than the mean speed of said motor, whereby a mean peripheral speed of said capstan is equal to a mean speed of forward travel of said film under the action of said claw.

4. A camera as claimed in claim 1 wherein said capstan comprises a flywheel and including a very flexible belt drivingly coupling said capstan and said capstan motor.

5. A camera as claimed in claim 2 wherein said capstan comprises a flywheel and including a very flexible belt drivingly coupling said capstan and said capstan motor.

6. A camera as claimed in claim 3 wherein said capstan comprises a flywheel and including a very flexible belt drivingly coupling said capstan and said capstan motor.

7. A camera as claimed in claim 1 wherein said capstan comprises a two-part flywheel, and including a belt for drivingly connecting said capstan motor to one of said parts of said flywheel, the other of said two parts of said flywheel being rotatable with respect to said first flywheel part and being elastically biased to a position of equilibrium with respect to said one part.

8. A camera as claimed in claim 2 wherein said capstan comprises a two-part flywheel, and including a belt for drivingly connecting said capstan motor to one of said parts of said flywheel, the other of said two parts of said flywheel being rotatable with respect to said first flywheel part and being elastically biased to a position of equilibrium with respect to said one part.

9. A camera as claimed in claim 3 wherein said capstan comprises a two-part flywheel, and including a belt for drivingly connecting said capstan motor to one of said parts of said flywheel, the other of said two parts of said flywheel being rotatable with respect to said first flywheel part and being elastically biased to a position of equilibrium with respect to said one part.

* * * * *